United States Patent [19]

Yamada

[11] 4,350,909

[45] Sep. 21, 1982

[54] BRUSH LEAD STRUCTURE FOR MOTOR-IMMERSED FUEL PUMPS

[75] Inventor: Masahide Yamada, Azumamura, Japan

[73] Assignee: Mitsuba Electric Mfg. Co., Ltd., Gunma, Japan

[21] Appl. No.: 130,940

[22] Filed: Mar. 17, 1980

[51] Int. Cl.$^3$ ...................... H01R 39/36; H02K 13/00

[52] U.S. Cl. ...................................... 310/62; 310/249; 417/368; 174/126 CP

[58] Field of Search ............. 310/45, 52, 62, 233-237, 310/248-253, 87; 29/597; 417/366, 368, 410; 427/118, 120; 174/126 R, 126 CP

[56] References Cited

U.S. PATENT DOCUMENTS

| | | | |
|---|---|---|---|
| 2,802,897 | 8/1957 | Hurd et al. | 427/118 |
| 3,873,243 | 3/1975 | NUM/u/ sser et al. | 417/368 |
| 3,969,044 | 7/1977 | Füssner et al. | 417/366 |
| 4,033,800 | 7/1977 | Ollis | 427/118 |
| 4,042,753 | 8/1977 | Smith | 428/651 |
| 4,075,524 | 2/1978 | Bradshaw et al. | 310/249 |
| 4,189,331 | 2/1980 | Roy | 148/6.31 |

FOREIGN PATENT DOCUMENTS

| | | | |
|---|---|---|---|
| 936933 | 11/1973 | Canada | 174/126 CP |

*Primary Examiner*—A. T. Grimley

*Assistant Examiner*—D. Rebsch

*Attorney, Agent, or Firm*—Townsend and Townsend

[57] ABSTRACT

A motor-immersed fuel pump for a fuel supplying system of vehicles such as an automobile wherein the motor for driving the pump is completely immersed in the flow of fuel for cooling, thereby attaining an extended service life. At least that part of the brush lead which is exposed to fuel of such a motor-immersed fuel pump is composed of a material which is non-reactive with the fuel.

8 Claims, 3 Drawing Figures

BRUSH LEAD STRUCTURE FOR MOTOR-IMMERSED FUEL PUMPS

BACKGROUND OF THE INVENTION

The present invention relates to the structure of a brush lead used in a motor-immersed fuel pump, and particularly the present invention provides a brush lead with a structure in which at least the portion of a brush lead exposed to fuel is composed of a material which is non-reactive with the fuel, thereby fuel is free of deterioration and the brush lead is protected from erosion, which, in turn, insures the long service life of the fuel pump and high performance of an internal combustion engine to which fuel is transported by the pump.

As schematically shown in FIG. 1, a motor-immersed fuel pump is a type of fuel pump used in an engine-driven vehicle such as an automobile. Referring to FIG. 1, a motor-immersed fuel pump 1 includes a pump mechanism 2, which is of the vane type. The vane pump 2 includes a rotor 2*a* which is fixedly mounted on and at one end of a driving shaft 3*a* of a motor 3. The motor 3 is completely housed in a casing 5 and a motor chamber 4 is defined in-between. Thus, when the rotor 2*a* is driven to rotate by the motor 3, fuel is introduced into the motor chamber 4 through an inlet port 1*a* and discharged exteriorly through an outlet port 1*b*, as shown by the arrows. As described above, since the motor 3 is completely immersed in the flow of fuel, heat generated inside the motor 3 is carried away and the motor 3 can be maintained at low temperatures as desired. Moreover, sparks between a commutator 6 and a brush 7 are suppressed and the induced explosion of vaporized fuel by these sparks is prevented from occuring. These are the main advantages of a motor-immersed fuel pump.

It should be recalled that for the operation of the motor 3, a lead wire 8 must be provided for the electrical connection between the brush 7 and an exterior source (not shown). It is a well established practice to use copper or copper alloy as the most suitable material for the lead wire 8 for various reasons such as high electrical conductivity, excellent mechanical workability, and economical advantage. If a fuel pump is of the type in which the motor is not immersed in the flow of fuel, but rather positioned in the atmosphere, no particular problems with respect to the lead wire 8 exist. However, in the case of a motor-immersed fuel pump as shown in FIG. 1, there are disadvantages since the copper or copper alloy lead wire 8 is also immersed in the fuel, usually gasoline. In this instance, the copper ingredients in the lead wire react with gasoline so that gasoline undergoes adverse effects such as being oxidized and thus oxidized gasoline promotes the corrosion of the lead wire. Such phenomenon of the deterioration of fuel, usually gasoline, by reaction with copper ingredients, particularly copper ions, is well known.

When use is made of alcohol added gasoline, so-called gasohol, which has recently become very popular as a means to curb energy crunch problems, the reaction rate between the fuel and the copper ingredients increases markedly and there is even a possibility that the lead wire including copper as an ingredient could be partly eaten away due to extensive corrosion after short hours of service. Moreover, in order to obtain required flexibility, the lead wire is usually made by twisting or weaving a plurality of fine strand wires, rather than a single fat wire, which makes the contact area with fuel larger; therefore, the reaction rate is increased and the lead wire is easier to corrode.

SUMMARY OF THE INVENTION

It is thus a main object of the present invention to provide, in a motor-immersed fuel pump, a brush lead structure which prevents fuel, usually gasoline, from being deteriorated.

It is another object of the present invention to provide, in a motor-immersed fuel pump, a brush lead structure which prevents the brush lead from being corroded by fuel, usually gasoline.

It is a further object of the present invention to present a motor-immersed fuel pump which can always supply fuel of guaranteed quality to an internal combustion engine.

It is still a further object of the present invention to present a motor-immersed fuel pump which is highly durable and serviceable for a long period of time.

Other objects, features, and advantages of the present invention will become apparent after a reading of the remainder of this specification and the attached drawings.

DESCRIPTION OF THE PREFERRED EMBODIMENTS

Figures 1, 2, 3:
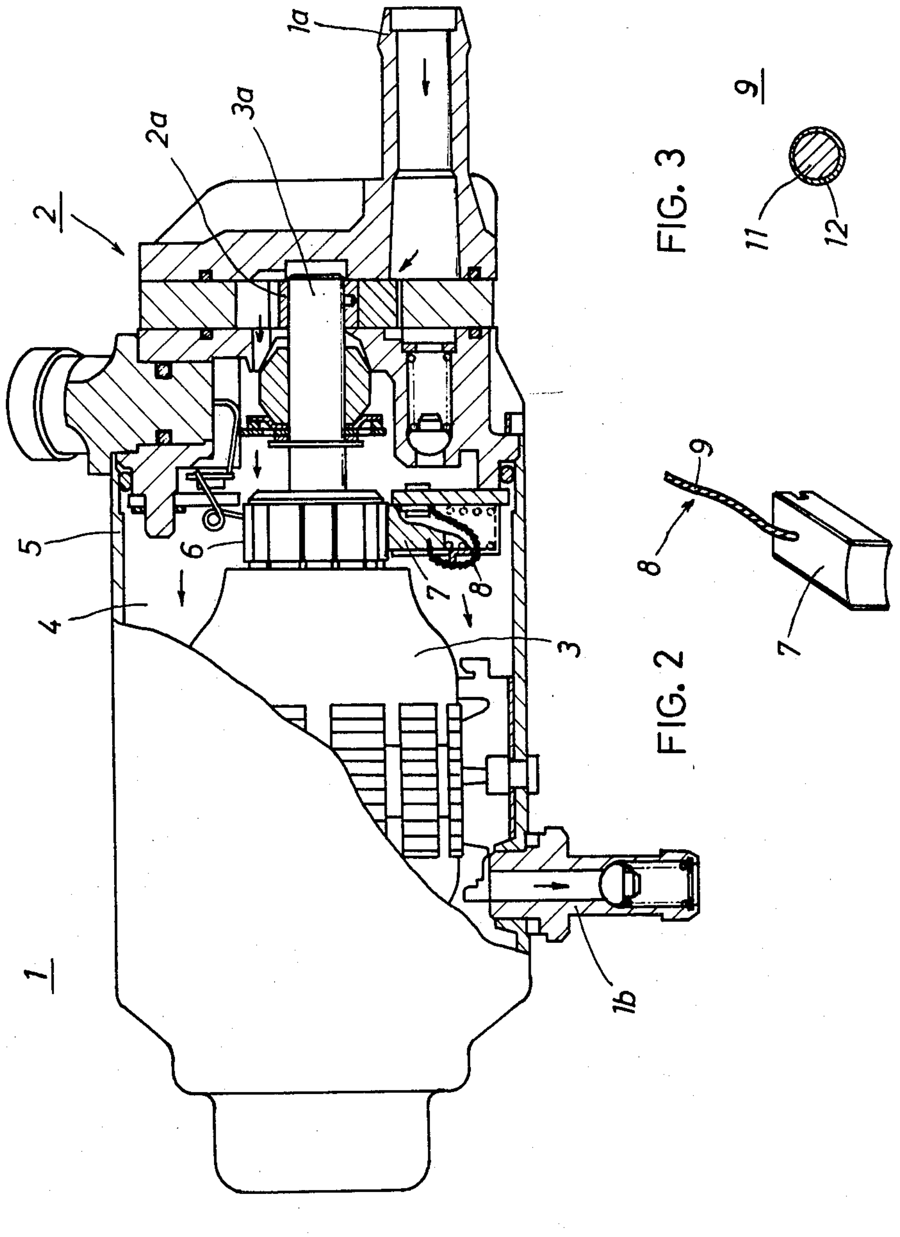
FIG. 1 is a partially cut-away cross-sectional view of the motor-immersed fuel pump.
FIG. 2 is an enlarged perspective view showing the brush and lead wire assembly in accordance with the present invention.
FIG. 3 is a cross-sectional view of a fine strand wire in accordance with the present invention.

Referring to FIG. 2, there is shown a lead wire 8 of the present invention, one end of which is connected to a brush 7 which is normally in contact with a commutator 6 for operation. Although the lead wire 8 shown in FIG. 2 is formed by twisting a plurality of fine strand wires 9 together, it should be obvious that the lead wire of the present invention can be formed by weaving a plurality of fine strand wires or by a single fat wire.

In accordance with one embodiment of the present invention, the lead wire 8 is formed by a material which is highly non-reactive with fuel, particularly gasoline, and does not contain copper ingredients. Some examples of such material include tin, nickel, silver, silver alloy, stainless steel, and aluminum. Where the lead wire is formed by one of these materials, the lead wire will not give adverse effects to the fuel and also the lead wire is virtually free of corrosion. However, it is still preferable to use copper or copper alloy to form the lead wire 8 from over-all considerations including electrical conductivity, mechanical workability, and economical advantage.

Therefore, as another embodiment of the present invention, the lead wire is formed of a copper or copper alloy core region and a protective layer completely surrounding the core region. Such a protective layer can be formed on a fine strand wire or directly on a lead wire. Referring to FIG. 3, there is shown a fine strand wire 9 which comprises a copper or copper alloy core region 11 and a protective layer 12 completely surrounding the core region 11, whereby the protective layer 12 is formed by a material which does not contain copper ingredients and is highly non-reactive with fuel, particularly gasoline. The protective layer 12 may be formed by spraying, electro-plating, or any other convenient techniques. Preferred materials for the protective layer 12 include tin, nickel, silver, silver alloy, and aluminum.

As described above, the lead wire 8 of the present invention has a structure in which at least that part exposed to fuel is composed of a material which is highly non-reactive with the fuel; therefore, the fuel receives no adverse effects from the lead wire and vice versa. This also enables a supply of fuel of the guaranteed quality to an internal combustion engine at all times, which, in turn, contributes to the maintenance of a high, proper combustion efficiency and the protection of the engine itself. On the other hand, since the lead wire is virtually free of corrosion, the pump can be used for an extended period of time. According to the prior art, when the lead wire was disconnected due to corrosion, the fuel pump as a whole had to be replaced, or at least removed for repair, while the present invention does not possess such disadvantage.

As shown in FIG. 2, the connection between the lead wire 8 and the brush 7 is generally formed by planting one end of lead wire 8 in the brush 7 when the brush 7 is manufactured mainly from carbon by sintering. However, since the temperature is raised to about 800 degrees C. during such sintering process, the lead wire 8 must be composed of materials which are resistant to such a high temperature condition if the connection between the brush and the lead wire is to be formed at the same time as sintering the brush 7.

In accordance with one embodiment of the present invention, use was made of a lead wire 8 formed by a plurality of fine strand wires 9, each comprising a copper core region 11 and a nickel electro-plated layer 12 of 2 to 6 microns thickness on the peripheral surface of the copper core region 11. One end of this lead wire 8 was planted in the brush 7 and the brush was sintered at about 800 degrees C., thereby forming the connection between the lead wire 8 and the brush 7 simultaneously. It was found that the nickel electro-plated layer 12 of this thickness range was not destroyed; and, therefore, the copper core region 11 was not exposed as a result of being subjected to such a high temperature condition. It was also found that the above-noted thickness range of the nickel electro-plated layer 12 did not impair the flexibility required for the lead wire 8. An upper limit for the thickness of the nickel electro-plated layer 12 should be determined in such a manner that the lead wire 8 as a final product still has enough flexibility as required. On the other hand, the nickel electro-plated layer 12 must be thick enough to protect the copper core region 11. The preferred thickness range was found to be 2 to 6 microns for nickel. This embodiment is particularly advantageous because copper and nickel are less expensive than other comparable materials. It is also advantageous because the prior art sintering technique can be applied to form the connection between the lead wire 8 and the brush 7.

It will be understood that various changes in details, materials, and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

I claim:

1. In a fuel pump in which a motor for driving the pump is completely immersed in the flow of fuel, the motor having a commutator, at least one sintered carbon brush in sliding contact with said commutator of said motor, and a lead wire connected to said brush, a portion of said lead wire being exposed to said fuel when said pump is in situ, the improvement wherein said exposed portion of said lead wire is composed of a material non-reactive with said fuel and the connection between said lead wire and said brush is formed by planting one end of said lead wire in said brush, said material non-reactive with said fuel being thick enough to resist the sintering temperature but thin enough to give flexibility such that the sliding contact between said brush and said commutator may be maintained even if said brush is gradually worn out.

2. The fuel pump of claim 1 wherein said lead wire is formed by twisting or weaving a plurality of fine strand wires.

3. The fuel pump of claim 1 wherein said lead wire comprises a copper or copper alloy core region and a protective layer formed on the periphery of said core region from a material non-reactive with said fuel.

4. The fuel pump of claim 3 wherein said protective layer is an electro-plated layer of nickel.

5. The fuel pump of claim 4 wherein the thickness of said electro-plated layer is in the range from 2 to 6 microns.

6. The fuel pump of claim 3 wherein said protective layer is a material selected from the group consisting of tin, nickel, silver, silver alloy and aluminum.

7. The fuel pump of claim 1 wherein said fuel is gasoline.

8. The fuel pump of claim 1 wherein said fuel is gasohol.

* * * * *